United States Patent [19]

Saitou

[11] Patent Number: 4,893,018

[45] Date of Patent: Jan. 9, 1990

[54] RADIATION DETECTING CIRCUIT INCLUDING POSITIONAL ERROR CALIBRATOR

[75] Inventor: Satoshi Saitou, Tochigi, Japan

[73] Assignee: Kabushiki Kaisha Toshiba, Kawasaki, Japan

[21] Appl. No.: 51,644

[22] Filed: May 20, 1987

[30] Foreign Application Priority Data

May 21, 1986 [JP] Japan .................................. 61-116869
May 28, 1986 [JP] Japan .................................. 61-122818

[51] Int. Cl.$^4$ ............................................. G01T 1/22
[52] U.S. Cl. .......................... 250/370.10; 250/370.13; 250/370.01
[58] Field of Search ...................... 250/370.10, 370.13, 250/370.06, 370.01, 370.08, 370.09, 363.02

[56] References Cited

U.S. PATENT DOCUMENTS

| | | | |
|---|---|---|---|
| 3,872,287 | 3/1975 | Koeman | 250/370.06 |
| 3,896,313 | 7/1975 | Berman et al. | 250/370.01 |
| 4,243,885 | 1/1981 | Agouridis et al. | 250/370.07 |
| 4,578,583 | 3/1986 | Ciammaichella et al. | 250/372 |
| 4,652,766 | 3/1987 | Wang et al. | 250/370.13 |
| 4,727,256 | 2/1988 | Kumazawa | 250/370.10 |

FOREIGN PATENT DOCUMENTS 0014590 1/1986 Japan .................................. 250/370.01

OTHER PUBLICATIONS

Allison, "Cadmium Telluride Matrix Gamma Camera" *Medical Physics*, vol. 7, No. 3, May/Jun. (1980), pp. 202-206.

*Primary Examiner*—Janice A. Howell
*Assistant Examiner*—William F. Rauchholz
*Attorney, Agent, or Firm*—Finnegan, Henderson, Farabow, Garrett and Dunner

[57] ABSTRACT

A radiation detecting circuit includes a semiconductor radiation detector, a charge converting circuit, a duration time measuring circuit, an incident position detecting circuit, and a correcting circuit, A photon is detected by the detector, and charges are induced therein. Based upon these charges, the duration time period of induction current is measured, and the positional signal of the incident photon is produced based upon the duration time period of the incident photon. The voltage output from the charge converting circuit is corrected on the basis of the positional signal so as to produce an energy value of the incident photon independent of the incident position on the detector.

16 Claims, 13 Drawing Sheets

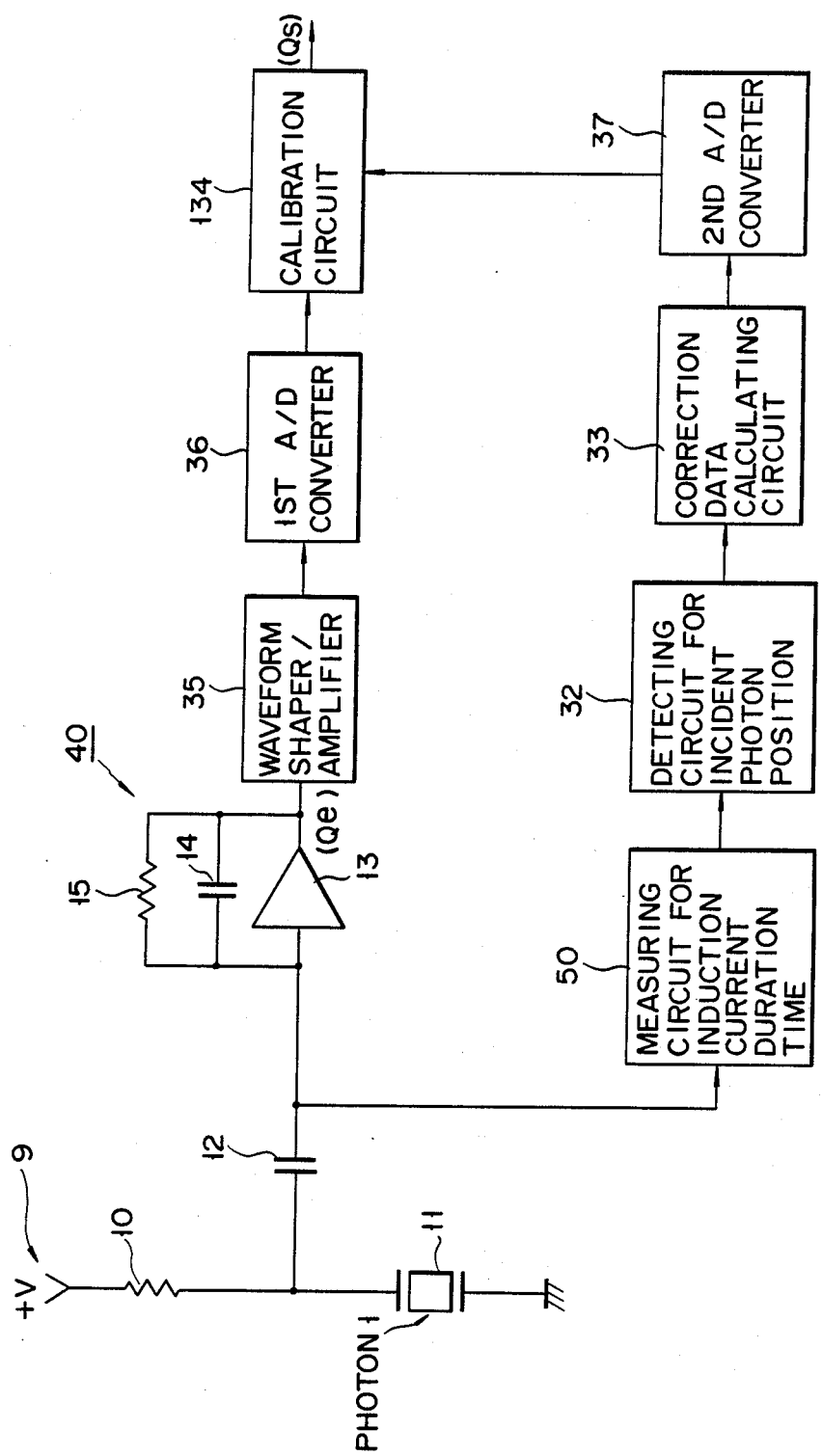
F I G. 13

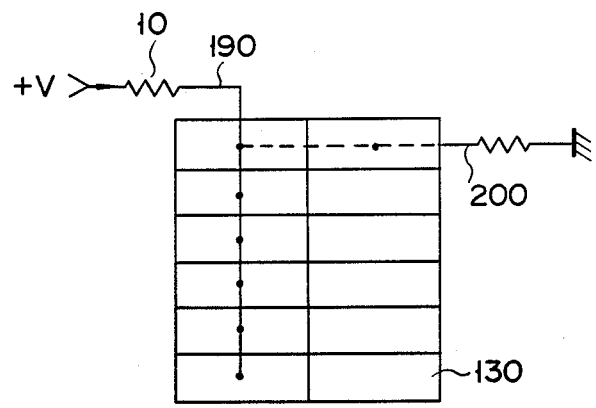
F I G. 20
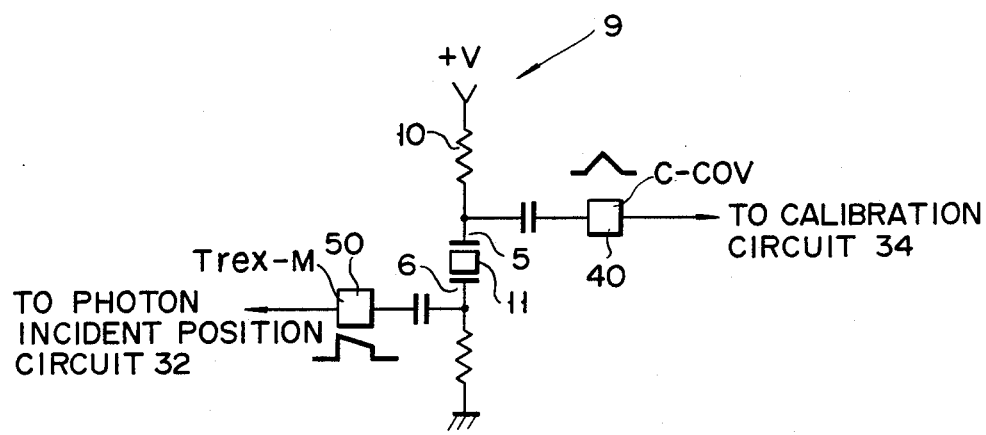
F I G. 21

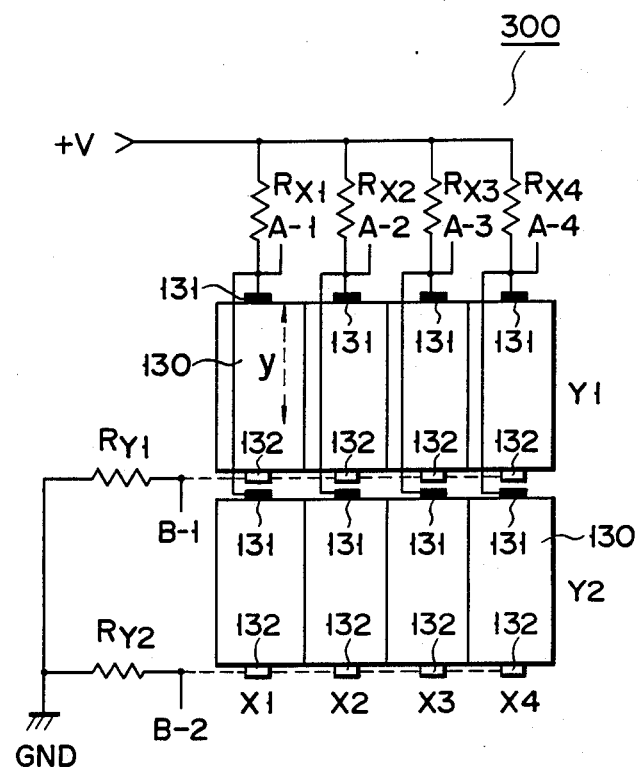
F I G. 22A

RADIATION DETECTING CIRCUIT INCLUDING POSITIONAL ERROR CALIBRATOR

BACKGROUND OF THE INVENTION

1. Field of the Invention

The present invention generally relates to a radiation detecting circuit, and, more particularly, to a circuit arrangement for correcting a signal adversely influenced by a photon-detected position on a radiation detector.

2. Description of the Related Art

Various radiation detecting devices have been proposed to acquire radiation data such as photon energies and photon distributions. A direct conversion type semiconductor detector for converting photon energies of radiation directly into electronic signals has been recently widely used for a spectrometer/counter and the like for radiation, e.g., γ-rays.

An operation principle of such a semiconductor γ-ray detector will be described below.

As shown in FIG. 1, when photons 1 are incident on a bulk type semiconductor γ-ray detector 2, photon energies are converted into pairs of electrons 3 and holes 4 by Compton scattering or photoelectric absorption effects. A total sum of energies of the electron-hole pairs generated in semiconductor γ-ray detector 2 is equal to energy Ei of the incident photons. Of the pairs of electrons and holes, electrons 3 move toward high voltage electrode 5 and holes 4 move toward ground electrode 6 by an electric field applied to these electrodes of semiconductor γ-ray detector 2. An induction current is produced by change over time in an electric field (electric charge) induced on the electrode surfaces by migration of electrons 3 and holes 4 in the semiconductor. The induction current is conducted to an external circuit. FIG. 2 illustrates changes in the electric field on both the electrodes caused by movement of electrons 3.

Assuming that electric charges of electrons and holes are respectively "e" and a distance between the electrodes is "D", electric charge "q", induced on the electrode surfaces when electrons 3 move between electrodes 5 and 6 by distance "X" as shown in FIG. 3, is obtained as follows:

$$q = e \cdot X/D \tag{1}$$

Therefore, assuming that the total electric charge of electrons (holes) generated by the incident photons is "$Q_{total}$", the total electric charge induced on the electrode surfaces by the electron-hole pairs generated at a position separated from the high voltage electrode surface by distance "X" is:

$$Q_{total} = Q_e \cdot X/D + Q_h \cdot (D-X)/D \tag{2}$$
$$= Q_e, \text{ or } Q_h$$

for $Q_e = Q_h$. Thus, $Q_{total}$ is equal to the total electric charge of electrons (or holes) initially generated by the incident photon energies, and a voltage output proportional to the incident energies can be obtained by a charge sensitive converting circuit.

In addition, the induction current flows through the external circuit only while electrons (or holes) move between these electrodes. Induction current duration times "$T_{reX}$" and "$T_{rhX}$", of the respective electrons and holes are obtained as follows:

$$T_{reX} = X/V_{de}$$
$$T_{rhX} = (D-X)/V_{dh} \tag{3}$$

where $V_{de}$ and $V_{dh}$ are drift velocities of electrons and holes, respectively. Assuming that $\mu_e$ and $\mu_h$ are respectively mobilities of electrons and holes and E is the electric field, drift velocities $V_{de}$ and $V_{dh}$ are obtained as follows:

$$V_{de} = \mu_e \cdot E$$
$$V_{dh} = \mu_h \cdot E \tag{4}$$

In addition, the magnitude of the flowing induction current is:

$$I = I_e + I_h = Q_e/T_{re} + Q_h/T_{rh} \tag{5}$$

where Ie and Ih are respectively currents caused by movement of electrons and holes, and $T_{re}$ and $T_{rh}$ are respectively times required for electrons and holes to move between the electrodes and are obtained as follows:

$$T_{re} = D/V_{de}, \quad T_{rh} = D/V_{dh} \tag{6}$$

FIG. 4 is a graphic representation showing an induction current caused by movement of electrons and holes. Since mobilities of electrons and holes are different from each other, their current values and induction current duration times are different from each other. Note that in FIG. 4, reference numeral 7 denotes an induction current cased by electrons; and 8, an induction current caused by holes.

Integral values of the currents are total electric charges induced on the electrode surfaces. That is:

$$Q_e \cdot X/D = \int_0^{T_{reX}} I_e \cdot dt \tag{7}$$

$$Q_h \cdot (X/D)/D = \int_0^{T_{reX}} I_h \cdot dt$$

As is apparent from the above equation (2), the incident photon energies can be recognized as the total sum of the electric charge induced by movement of electrons and the electric charge caused by movement of holes.

However, in a semiconductor radiation detector, electrons and holes may sometimes be trapped during movement in the detector because of impurities and vacancies moving in the crystal inside the detector. Assuming that a lifetime of electrons (or holes) determined by trapping is $\tau_e$ (or $\tau_h$), an electric charge induced by movement of electrons and holes is as follows:

$$q = (V_{de} \cdot Q_e \cdot \tau_e)/D \cdot (1 - e^{X/\tau_e V_{de}}) + (V_{dh} \cdot Q_h \cdot \tau_h)/D \cdot (-1 - e^{-(D-X)/\tau_e V_{dh}}) \tag{8}$$

Furthermore, in a room-temperature operating semiconductor detector of CdTe (cadmium telluride) with a high efficiency, mobility of holes is often considerably smaller than that of electrons (i.e., $V_{dh} < V_{de}$), and the lifetime of holes is often considerably smaller than that of electrons (i.e., $\tau_h < \tau_e$).

Consequently, an electric charge induced on electrode surfaces is mostly caused by movement of electrons, and contribution of holes thereto is small. As a result, the equation (8) is approximated as follows:

$$q = (V_{de} \cdot Q_e \cdot t_e)/D \cdot (1 - e^{-X/\tau_e V_{de}}) \qquad (9)$$

Therefore, the total electric charge induced on the electrode surfaces depends on a generating unit (i.e., an incident position of photons) of electron-hole pairs, thereby significantly degrading energy resolution of the detector. For this reason, in the obtained radiation energy distribution, a problem of an unclear photo-peak appears in FIG. 5.

Recently, a gamma camera aiming at a high positional/energy resolution, a high counting efficiency, and compactness has been developed. In this gamma camera, semiconductor γ-ray detectors of the type described above are arranged in a matrix array.

An electronic circuit for extracting an output signal form such a gamma camera is constituted by charge sensitive preamplifier 110 connected to semiconductor γ-ray detector element 100, waveform shaper/amplifier 112, SCA (single channel analyzer) 113 for selecting only photons having proper energies, and counter/memory 114, as shown in FIG. 6. The electronic circuit displays on a display unit (hnow shown) a two-dimensional distribution of a radiation source in real time, or after integrating for a predetermined period of time. Although such electronic circuits must be provided for the same number as that of detectors constituting a camera matrix, only one electronic circuit is shown in FIG. 6 for the sake of simplicity.

However, it is very difficult to arrange detectors and electronic circuits, the total number of which correspond to the number of elements (e.g., m×n elements) constituting the matrix array. On the other hand, in order to reduce the total number of electronic circuits, signals may be extracted from both the high voltage and ground potential sides of one detector. That is, as shown in FIG. 7, as for high voltage side 115, outputs are common in a lateral direction (line direction), and as for ground side 116, outputs are common in a transverse direction (column direction), thereby extracting signals. For example, such a conventional signal extracting method is described in "Cadmium telluride matrix gamma camera" Jerry D. Allison, Medical Physics 7(3), May/June 1980, pages 202 to 206, American Association Phys. Med.

However, if such a conventional signal extracting method is employed, detectors must be required to corespond to the number of matrix's elements. Thus, the detectors must be packed at high density to increase positional resolution, that necessarily requires a very difficult and complex manufacture technique.

Therefore, the present invention has been made in consideration of the situation as described above, and has as its primary object to provide a radiation detecting circuit with high energy resolution, which is capable of faithfully recognizing incident energies independently of an incident position of photons incident on a radiation detecting circuit.

In addition, another object of the present invention is to provide a gamma camera which is capable of utilizing such a radiation detecting circuit with high energy resolution, thereby realizing high resolution which a smaller number of detectors.

SUMMARY OF THE INVENTION

These objects of the present invention are accomplished by providing a radiation detecting circuit arrangement comprising:

a semiconductor radiation detector having two electrodes to sandwich the detector, to which a predetermined biasing voltage is being applied, for detecting radiation energy incident thereon to derive an electric signal;

a converting circuit for converting total electric charge induced in the detector into a corresponding voltage in response to the electric signal detected from the detector;

a circuit for measuring a duration time period of induction current caused by movement of electrons occurring in the detector in response to the detected electric signal;

a circuit for detecting a position of the radiation incident upon the detector on the basis of said duration time period of induction current to produce a positional signal of the incident radiation; and a circuit for correcting the voltage output from the converting circuit based upon the positional signal of the incident radiation to thereby produce an energy value of the radiation independent of the incident position thereof.

According to the present invention, induction current duration time $T_{reX}$ of an induction current caused by movement of electrons in a semiconductor is measured, photon incident position X is detected on the basis of induction current duration time $T_{reX}$, and an output from a charge sensitive converting circuit can be calibrated, on the basis of photon incident position X, into a value completely independent of photon incident position X, thereby providing a radiation detecting circuit with high resolution capable of faithfully recognizing incident energies.

Furthermore, the invention is characterized by comprising a radiation detecting circuit arrangement comprising:

a rectangular semiconductor radiation detector having two electrodes to sandwich the detector along a longitudinal direction of the detector, to which a predetermined biasing voltage is being applied, for detecting radiation energy incident thereon to derive an electric signal;

a converting circuit for converting total electric charge induced in the detector into a corresponding voltage in response to the electric signal detected from the detector;

a circuit for measuring a duration time period of induction current caused by movement of electrons occurring in the detector in response to the detected electric signal;

a circuit for detecting a position of the radiation incident upon the detector on the basis of said duration time period of incident current to produce a positional signal of the incident radiation; and, a circuit for correcting the voltage output from the converting circuit based upon the positional signal of the incident radiation to thereby produce an energy value of the radiation independent of the incident position thereof.

According to the present invention, a matrix gamma camera can be obtained that is capable of detecting a photon incident position with high resolution under the condition that numbers of required detectors and output voltage processing circuits can be reduced.

BRIEF DESCRIPTION OF THE DRAWINGS

For a better understanding of the present invention, reference is made in the following description in conjunction with the drawings, in which:

FIG. 13 is a schematic diagram of a digital type radiation detector according to a second preferred embodiment;

FIGS. 20 and 21 illustrate modifications according to the invention, and

FIGS. 22A and 22B illustrate a schematic diagram of a gamma camera employing a rectangular detector matrix array according to a fourth embodiment.

DETAILED DESCRIPTION OF PREFERRED EMBODIMENT

Basic Idea of Radiation Detector

Figure 1:
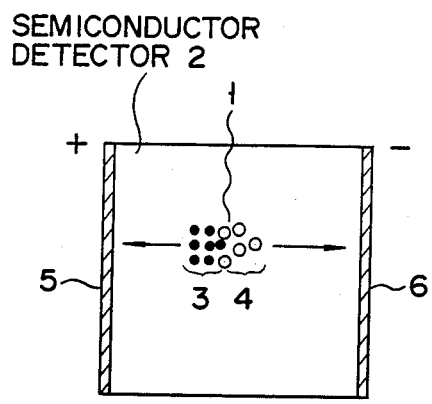
FIGS. 1 to 5 illustrate basic operations of carriers produced in a semiconductor radiation detector.
Figure 2:
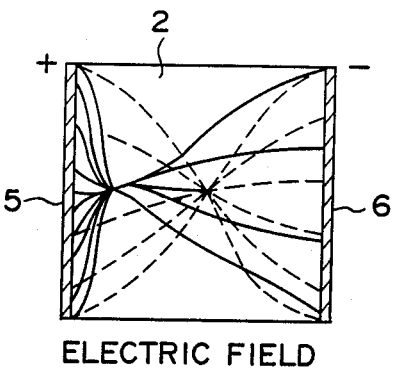
Figure 3:
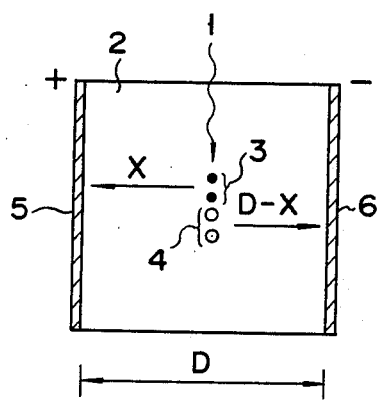
Figure 4:
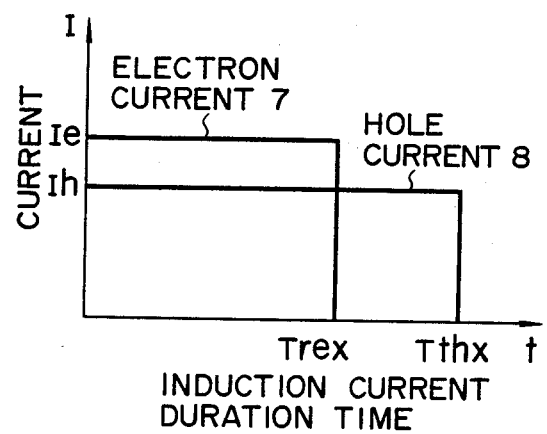
Figure 5:
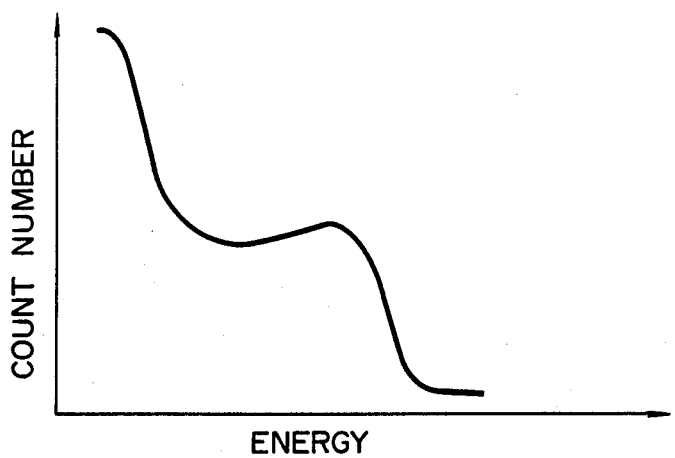
Figure 6:
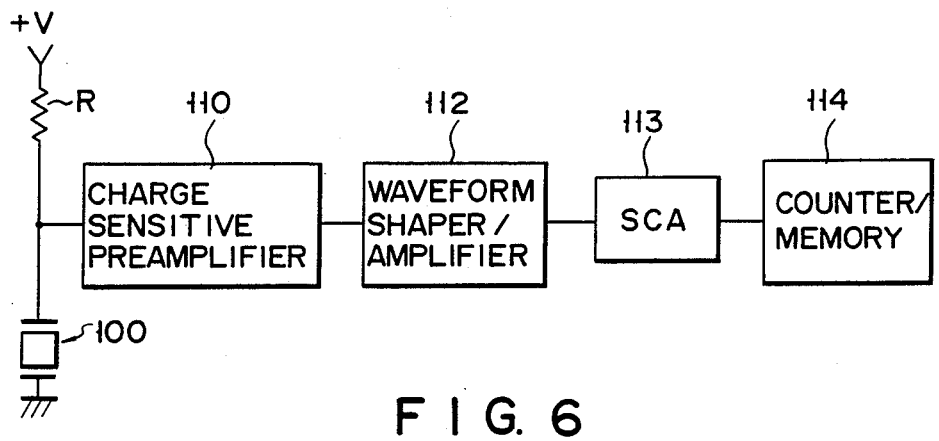
FIGS. 6 and 7 are a conventional gamma detector array and a gamma detecting circuit thereof.
Figure 7:
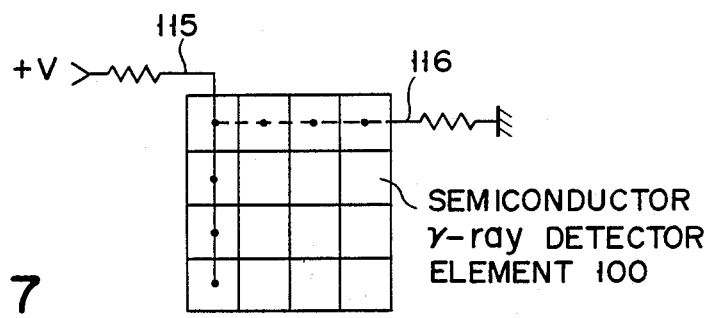

An output from a charge sensitive converting circuit for converting a total electric charge into a voltage is proportional to incident photon energies. These electric charges are induced on electrode surfaces of a semiconductor radiation detector for converting incident radiation energies into electric signals. This voltage value depends on a photon incident position along a longitudinal direction of the semiconductor radiation detector, or along a straight line intersecting center positions of two electrodes of the detector. Therefore, induction current duration time T of an induction current caused by movement of electrons is measured, and finally the photon incident position is calculated on the basis of the measured induction current duration time and known parameters. As a result, since the output from the charge sensitive converting circuit is calibrated on the basis of this positional information to obtain a photon energy value independent of the photon incident position, a radiation detecting circuit with high resolution can be achieved. It should be noted that calibration effected in a correction circuit depends on whether contribution of holes and trapping of electrons and holes are taken into consideration as in an embodiment to be described later.

Circuit Arrangement of Radiation Detecting Circuit

Referring now to a schematic block diagram shown in FIG. 8, a circuit arrangement of a radiation detecting circuit employing the above-defined basic idea according to the invention will be described.

One terminal of semiconductor gamma-ray detector 11 is grounded, and the other terminal thereof is connected to high voltage power source 9 through bias resistor 10. In addition, DC-cut capacitor 12 is connected to, e.g., high voltage electrode 9 of semiconductor γ-ray detector 11, and charge sensitive converting circuit 40 is connected to its output.

Figure 9:
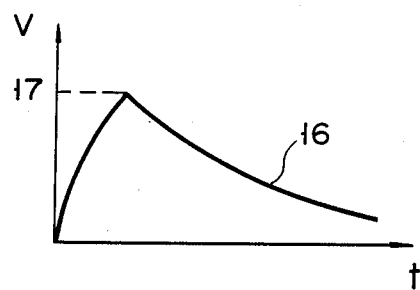
FIGS. 9 to 12 are illustrations to explain operations of the radiation detector shown in FIG. 8.

Charge sensitive converting circuit 40 includes amplifier 13, feedback capacitor 14, and feedback resistor 15, and a voltage value shown in FIG. 9 is derived as output 16 therefrom. In FIG. 9, reference numeral 17 represents an output value corresponding to incident photon energies.

Since voltage output 16 from charge sensitive converting circuit 40 depends on a photon incident position, various circuits are provided to calibrate this voltage output 16 in the radiation detecting circuit of according to the preferred embodiment.

First, measuring circuit 50 for induction current duration time has a function to measure induction current duration time $T_{reX}$ of an induction current caused by movement of electrons, generated by photons incident on semiconductor γ-ray detector 11, to electrode surfaces. The typical measuring circuit 50 for induction current duration time is constituted by the following circuit arrangements.

Figures 10A, 10B:
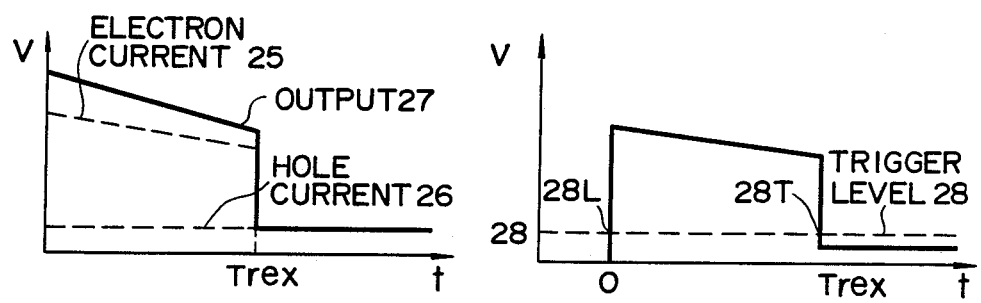
Figure 10C:
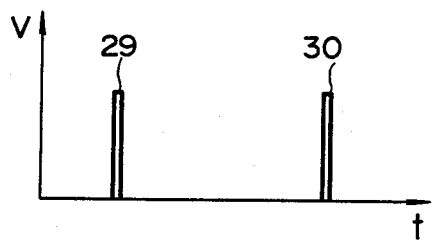
Figure 10D:
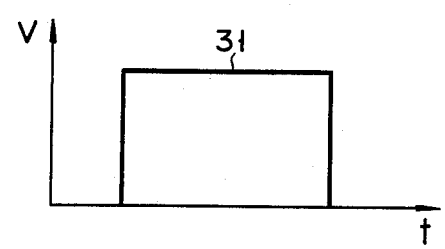
Figure 10E:
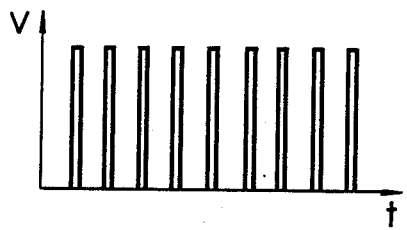
Figure 10F:
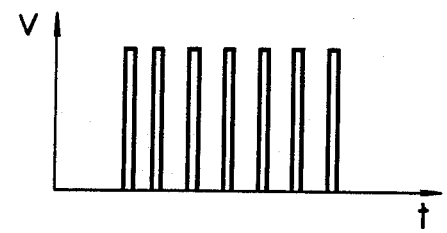

Reference numeral 18 denotes an I/V converter for converting the induction current into a voltage, and its output voltage is exemplified by solid line 27 in FIG. 10A. It should be noted that output voltage 27 is a sum of electron current 25 based on a current induced by movement of electrons and of hole current 26 based on a current induced by movement of holes. Reference numeral 19 represents an amplifier for amplifying an output from I/V converter 18. Reference numeral 20A denotes a trigger pulse generator. Trigger pulse generator 20A generates a trigger pulse when an output from amplifier 19 exceeds trigger level 28, shown in FIG. 10B and set by trigger level setting circuit 20B, and also when it decreases below trigger level 28 after it has exceeded trigger level 28. That is to say, trigger pulse generator 20A generates trigger pulses 29 and 30 at instances 28L and 28T in FIG. 10B. Note that in measuring circuit 50 for induction current duration time, in order to measure induction current duration time $T_{reX}$ of the induction current caused by movement of electrons, trigger level 28 is set at a level higher than that obtained by amplifying hole current 26 based on movement of holes by amplifier 19. Both trigger pulses 29 and 30 are shown in FIG. 10C. Reference numeral 21 denotes a rectangular wave generator for generating rectangular wave 31 as shown in FIG. 10D on the basis of trigger pulses 29 and 30. Reference numeral 23 denotes an AND gate for receiving rectangular wave 31 from rectangular wave generator 21 and a high-speed clock pulse (FIG. 10E) from high-speed clock pulse generator 22 and outputting an AND-gating thereof. As a result, the output from AND gate 23 is as shown in FIG. 10F. Reference numeral 24 denotes a counter for counting the output from AND gate 23, and this count corresponds to induction current duration time $T_{reX}$ of the induction current caused by movement of electrons.

Detecting circuit for photon incident position 32 detects photon incident position X along the longitudinal direction of semiconductor γ-ray detector 11 on the basis of the output from measuring circuit 50 for induction current duration time. That is, when induction current duration time $T_{reX}$ of the induction current caused by movement of electrons is obtained on the basis of the output from counter 24 and mobility $\mu_e$ of electrons in semiconductor γ-ray detector 11 and electric field strength "E" thereof are measured beforehand, the equations (2) and (3) yield the following equation (10):

$$X = T_{reX} \cdot \mu_e \cdot E \tag{10}$$

thereby detecting photon incident position X.

Position correction circuit 60 is mainly constituted by correction data calculating circuit 33 and calibration circuit 34. Based upon the photon incident position X detected by detecting circuit 32, correction data calculating circuit 33 calculates correction data (to be described later) for calibrating the output from charge sensitive converting circuit 40 so that the output ($Q_s$) does not depend on photon incident position X. Calibration circuit 34 calibrates the output ($Q_e$) from charge sensitive converting circuit 40 in accordance with the correction data so as to finally obtain the desired corrected voltage value ($Q_s$).

Correction Data/Calibration

Calculation of the correction data on photon incident positions and calibration based on the correction data will now be described below that is performed in position correction circuit 60.

Calculation of the correction data will be described with reference to three cases: (1) a case where contribution of holes and trapping of electrons are negligible; (2) a case where contribution of holes is negligible and trapping of electrons is taken into consideration; and (3) a case where contribution of holes are not negligible and trapping of electrons and holes is taken into consideration.

(1) Calculation of Correction Data in the First Case Where Contribution of Holes and Trapping of Electrons are Negligible The number of carriers generated by incident radiation on the detector has the following relationship:

$$Q_e \text{ (electrons)} = Q_h \text{ (holes)}$$

Figure 11A:
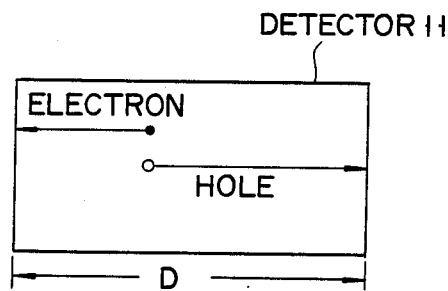
Figure 11B:
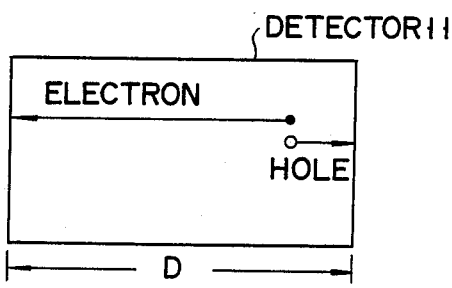

When a group of electrons having total electric charge ($Q_e$) moves by a distance D between the opposite electrodes of semiconductor γ-ray detector 11, electric charge ($Q_e$) is stored in an external circuit. This distance D is defined as a distance between the opposite electrodes 5 and 6 of detector 2 along the longitudinal direction of detector 2 (see also FIGS. 11A and 11B). This is known from the Ramo's theory.

In this case, time $T_{teD}$ required for electrons to move by the above-defined distance D is obtained as follows:

$$T_{reD} = D/V_{de} = D/\mu_e \cdot E \tag{11}$$

In addition, induction current I(t) caused by movement of electrons can be assumed to be constant in this case (1) where contribution of holes is negligible and electrons are assumed not to be trapped, and hence can be represented as $I(t) = I_{ce}$.

Therefore, electric charge $Q_e$ is represented by the following equation (12):

$$Q_e = \int_0^{T_{reD}} I_{ce} \cdot dt = T_{reD} \cdot I_{ce} \tag{12}$$
$$= I_{ce} \cdot D/\mu_e \cdot E$$

and $I_{ce}$ is represented by the following equation (13):

$$I_{ce} = Q_e (\mu_e \cdot E)/D \tag{13}$$

Then, assuming that electrons move only by distance X along the interelectrode direction, signal electric charge $Q_s$ stored during this movement of electrons is as follows:

$$Q_s = \int_0^{T_{reX}} I_{ce} \cdot dt \tag{14}$$

Since $T_{reX} = X/V_{de} = X/(\mu_e \cdot E)$, the equation (14) yields the following equation (15):

$$Q_s = I_{ce} \cdot T_{reX} \tag{15}$$
$$= \{Q_e \cdot (\mu_e \cdot E)/D\} \times (X/\mu_e \cdot E)$$
$$= Q_e \cdot (X/D)$$

where $Q_s$ is obtained (actually obtained as a voltage corresponding to $Q_s$) by charge sensitive converting circuit 40, X is detected by detecting circuit 32 for the photon incident position, and D is known as the distance between the electrodes of the detector as previously defined. Therefore, D/X is obtained as correction data by correction data calculating circuit 33, and calibration circuit 34 calculates the equation (16) as follows:

$$Q_e = Q_s \cdot (D/X) \tag{16}$$

thereby obtaining true electric charge $Q_e$ (actually obtained as the calibrated voltage) independent of X by calibration.

(2) Calculation of Correction Data in the Second Case Where Contribution of Holes is Negligible and Trapping of Electrons is Taken into Consideration In this case, induction current I(t) is represented as follows, taking trapping of electrons into consideration:

$$I(t) = I_{ce} \cdot e^{-t/\tau_e} \tag{17}$$

As a result, signal electric charge $Q_s$ is represented by the following equation (18):

$$Q_s = \int_0^{T_{reX}} I_{ce} \cdot e^{-t/\tau_e} \cdot dt \tag{18}$$
$$= I_{ce} \cdot e^{-t/\tau_e} / T_{reX}$$
$$= I_{ce} \cdot (-\tau_e)(e^{-T_{reX}/\tau_e} - 1)$$
$$= I_{ce} \cdot \tau_e (1 - e^{-X/\mu_e \tau_e \cdot E})$$
$$= Q_e \cdot \lambda_e/D(1 - e^{-X/\lambda_e})$$

where $\lambda_e = \mu_e \cdot \tau_e \cdot E$. Therefore, a true electric charge can be obtained by calibration circuit 34 in accordance with the following equation:

$$Q_e = Q_s \cdot (D/\lambda_e)/(1 - e^{-X/\lambda_e}) \tag{19}$$

In this case, the correction data is data to be multiplied with $Q_s$, and D, $\mu_e$, $\mu_e$, and E are obtained beforehand to obtain X as an output from detecting circuit for photon incident position 32.

(3) Calculation of Correction Data in the Third Case Where Contribution of Holes As Well As Trapping of Electrons and Holes Are Taken into Consideration In this case, induction current I(t) is obtained as follows:

$$I(t) = I_{ce} \cdot e^{-t/\tau_e} + I_{ch} \cdot e^{-t/\tau_e} \quad (20)$$

where $I_{ch} = Q_h \cdot (\mu_h \cdot E)/D$.

In this case, signal electric charge $Q_{+s}$ is represented by the following equation (21):

$$\begin{aligned} Q_s &= \int_0^{T_{re}X} I_{ce} \cdot e^{-t/T_e} \cdot dt + \\ &\quad \int_0^{T_{re}X(D-X)} I_{ch} \cdot e^{-t/T_h} \cdot dt \\ &= Q_e(\lambda_e/D)(1 - e^{-X/\lambda_e}) + \\ &\quad Q_h(\lambda_h/D)(1 - e^{-(D-X)/\lambda_h}) \\ &= Q_e\{(\lambda_e/D)(1 - e^{-X}/\lambda_e) + \\ &\quad (\lambda_h/D)(1 - e^{-(D-X)/\lambda_h})\} \end{aligned} \quad (21)$$

If a term multiplied with $Q_e$ in the right side of the equation (21) is represented by A, the correction term is represented by 1/A, and true (desired) electric charge $Q_e$ is obtained by calculating the following equation (22) by calibration circuit 34:

$$Q_e = Q_s \cdot 1/A \quad (22)$$

Note that in correction term 1/A, mobility $\mu_e$ and lifetime $\tau_e$ of electrons, mobility $\mu_h$ and lifetime $\tau_h$ of holes, and the above-defined distance D are previously measured, and X is obtained by detecting circuit 32 for a photon incident position.

Figure 12:
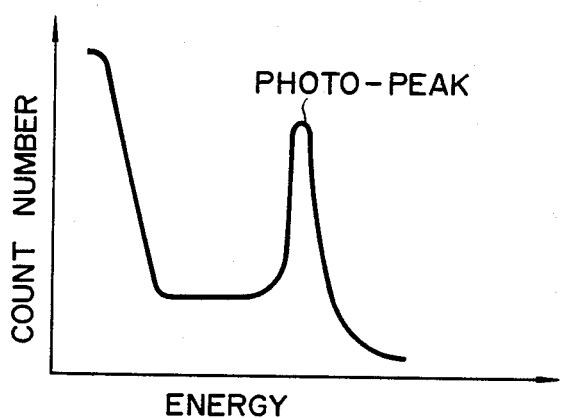

As described above, according to the radiation detecting circuit of this embodiment, predetermined correction data is obtained by photon incident position X and other parameters in accordance with each of first to third cases (1) to (3), and the output from charge sensitive converting circuit 40 is calibrated on the basis of the correction data. Therefore, an electric charge independent of photon incident position X can be detected, and a radiation energy characteristic obtained thereby has a remarkable photo-peak as shown in FIG. 12.

Digital Radiation Detecting Circuit

It is appreciated by those skilled in the art that the calibration operation described above may be performed also with digital values. That is, as shown in FIG. 13, waveform shaper/amplifier 35 and first A/D converter 36 are provided at the output side of charge sensitive converting circuit 40, and second A/D converter 37 is provided at the output side of calculating circuit 33. With this arrangement, digital calculation can be performed by calibration circuit 134 to obtain digital processing equivalent to that of the embodiment shown in FIG. 8.

Matrix Gamma Camera

A first operation mode in which the calibration circuit of the present invention is applied to matrix gamma camera 80 will now be described.

Figure 14:
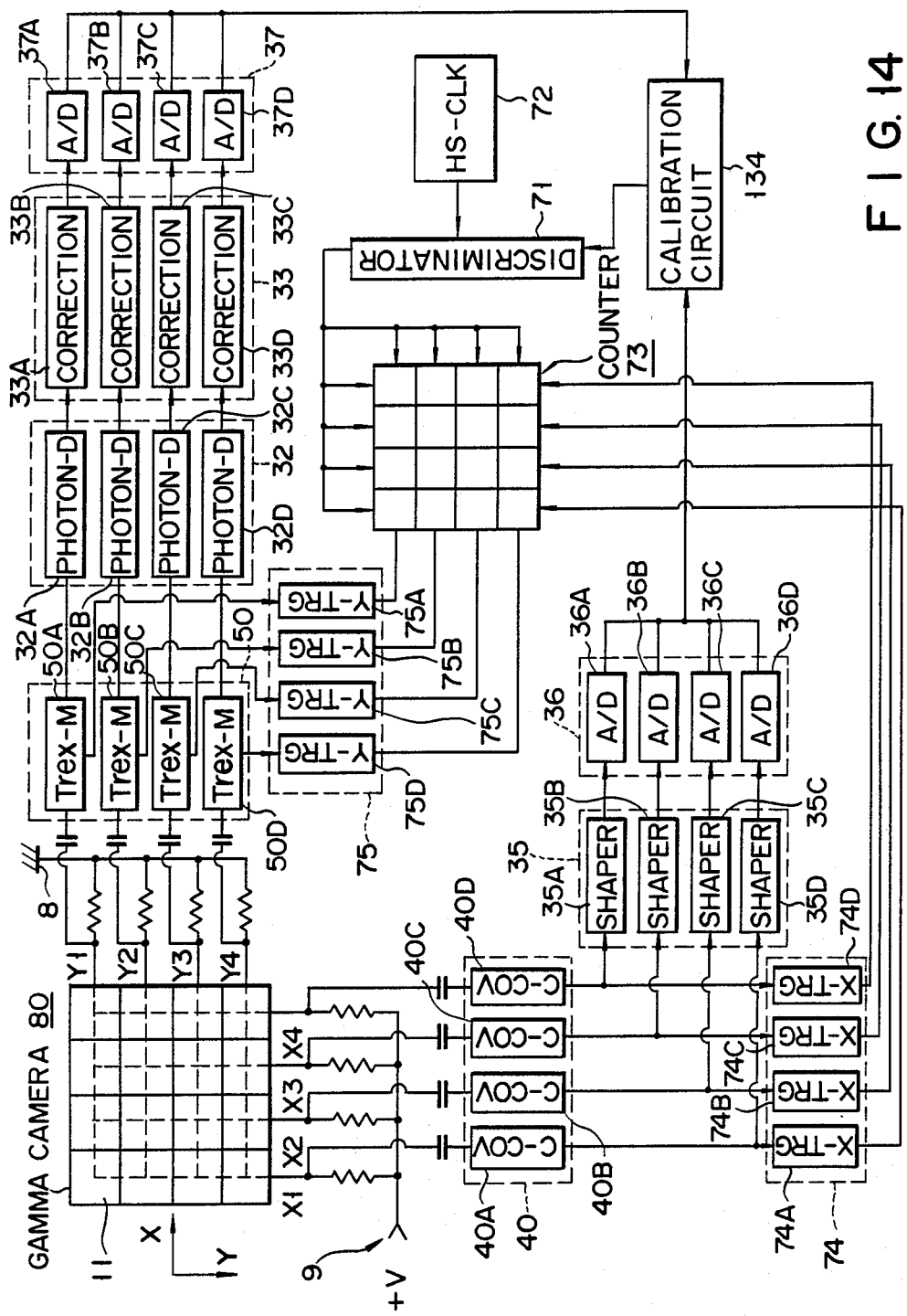
FIG. 14 is a schematic diagram of a matrix gamma camera employing the calibration circuit shown in FIG. 8.

Matrix gamma camera 80 is constructed by arranging semiconductor γ-ray detectors 11 in a two-dimensional matrix manner as shown in FIG. 14. In FIG. 14, each single rectangular corresponds to a single element of semiconductor γ-ray detector 11. Note that in FIG. 14, a 4×4 matrix of semiconductor γ-ray detectors 11 constitutes matrix gamma camera 80 for the sake of simplicity in explanation.

In order to extract signals from respective semiconductor γ-ray detectors 11 of matrix gamma camera 80, charge sensitive converting circuits 40 may be connected to semiconductor γ-ray detectors 11, respectively. However, in the circuit of this embodiment, signals are extracted from both the high voltage 9 side and ground 8 side. That is, as for high voltage 9 side, output terminals along the Y-direction are used in common to obtain outputs ($X_1$ to $X_4$) along the X-direction, and as for ground 8 side, output terminals along the X-direction are used in common to obtain outputs ($Y_1$ to $Y_4$) along the Y-direction.

Charge sensitive converting circuits 40, waveform shaper/amplifiers 35, and first A/D converters 36 described with reference to the above embodiment are sequentially connected to output terminals $X_1$ to $X_4$ at high voltage 9 side of matrix gamma camera 80. Similarly these circuits are provided to correspond to the number of the output terminals at ground 8 side, and symbols A to D of the respective circuits correspond to output terminals $X_1$ to $X_4$, respectively.

Measuring circuit for induction current duration time 50, detecting circuit for photon incident position 32, correction data calculating circuit 33, and second A/D converter 37 described with reference to the above embodiment are sequentially connected to output terminals $Y_1$ to $Y_4$ at ground 8 side. As in high voltage 9 side, these circuits are provided to correspond to the number of the output terminals at ground 8 side, and symbols A to D of the respective circuits correspond to output terminals $Y_1$ to $Y_4$, respectively.

All channels of output terminals of first A/D converters 36A to 36D for digital-converting values of incident photon energies supplied from output terminals $X_1$ to $X_4$ at high voltage 9 side are short-circuited and supplied to calibration circuit 134. In addition, all channels of output terminals of second A/D converters 37A to 37D for digital-converting correction data calculated on the basis of signals from output terminals $Y_1$ to $Y_4$ at ground 8 side are short-circuited and supplied to calibration circuit 134. As in the embodiment described above, calibration circuit 134 calibrates values of incident photon energies on the basis of the correction data, and outputs calibrated energy values independent of photon incident position X.

Furthermore, in order to count the number of incident photons over a predetermined level as values of incident photon energies for each of semiconductor γ-ray detectors 11 (i.e., at every X and Y positions) of matrix gamma camera 80, discriminator 71, high-speed clock circuit 72, counter circuit 73, X-direction trigger pulse generators 74, and Y-direction trigger pulse generators 75 are provided.

X-direction trigger pulse generator 74 is constituted by trigger pulse generators 74A to 74D for receiving outputs from charge sensitive converting circuits 40A to 40D and for generating trigger pulses when the inputs exceed a predetermined trigger level. Y-direction trigger pulse generator 75 is constituted by trigger pulse generators 75A to 75D for receiving pulses from trigger pulse generators 20 of measuring circuits for induction current duration time 50A to 50D and for generating a trigger pulse synchronized with first output pulses (FIG. 10C) from trigger pulse generators 20, respectively.

With this arrangement, a photon incident position $(X_n, Y_n)$ (where n=1 to 4) can be recognized on a matrix array in correspondence to a combination of trigger pulses from X- and Y-direction trigger pulse generators 74 and 75, respectively.

On the other hand, discriminator 71, high-speed clock circuit 72, and counter circuit 73 are provided to count the number of incident photons as values of incident photon energies with respect to pulses over a predetermined level on the basis of the output from calibration circuit 134. Discriminator 71 receives an output from calibration circuit 134 and a high-speed clock from high-speed clock circuit 72. Discriminator 71 outputs the high-speed pulse to counter circuit 73 while the output from calibration circuit 134 exceeds a predetermined discriminate level. However, discriminator 71 varies the level of the high-speed clock so that the counter circuit does not count when the output from calibration circuit 134 is below the discriminate level. In counter circuit 73, AND gates, counters, and memories (not shown) are arranged on the matrix array. A counter on a position (X,Y) where an AND-gating of trigger pulses from X- and Y-direction trigger pulse generators 74 and 75 is established integrates the high-speed clocks input through discriminator 71, and an integral value is stored in this position, thereby detecting the photon incident position and its energy value.

Thus, by applying the calibration circuit of the present invention to the matrix gamma camera, an energy value independent of the photon incident position along the longitudinal direction of the opposite electrodes for individual semiconductor γ-ray detector 11 can be obtained as an output from calibration circuit 34, thereby providing matrix gamma camera 80 with high resolution. Note that as an arrangement equivalent to that of this embodiment, measuring circuit for induction current duration time 50 may be connected to the high voltage electrode side of semiconductor γ-ray detector 11, and charge sensitive converting circuit 40 may be connected to the ground electrode side of semiconductor γ-ray detector 11. In addition, a matrix array is not limited to that of N×N elements, i.e., having the elements of the same number along the X- and Y-directions, but an N×M matrix array may be used.

Semiconductor Gamma-Ray Detector

A gamma camera utilizing a semiconductor gamma-ray detector according to the present invention will now be described in detail below.

Figure 15:
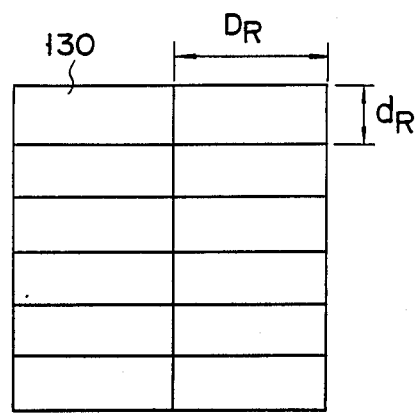
FIG. 15 illustrates a matrix gamma camera employing semiconductor gamma-ray detectors according to a third preferred embodiment of the invention.

It should be understood that the gamma camera 80 as described in the previous embodiment of FIG. 14, has a feature to employ the incident position correction circuit, whereas in a gamma camera of this embodiment, rectangular semiconductor radiation detectors 130 each having a width of $D_R \times d_R$ (mm) are arranged in a matrix array manner as shown in FIG. 15. In addition, as shown in FIG. 16, opposite electrodes 131 and 132 of each semiconductor radiation detector 130 are arranged such that a distance between these opposite electrodes 131 and 132 is $D_R$ and an electric field extends along the longitudinal direction of a rectangle.

Figure 17A:
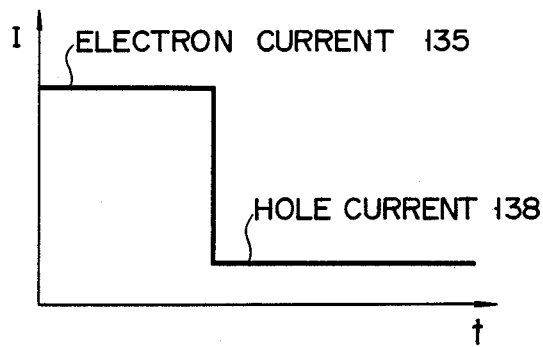
Figure 17B:
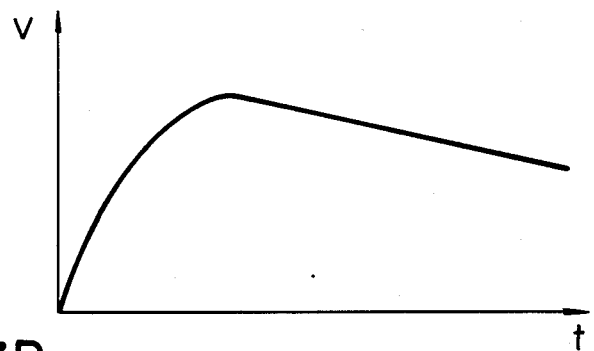

When photons 1 are incident on each semiconductor radiation detector 130 to generate electron-hole pairs, holes 4 move toward ground side (-side) 131 and electrons 3 move toward high voltage side (+side) 132 by an electric field in the detector. An electric charge is induced in electrodes 131 and 132 by movement of the electron-hole pairs, and an induction current is induced in an external circuit (not shown). This current is integrated by a charge sensitive converting circuit (to be described later) to be a voltage output. FIGS. 17A and 17B respectively show an output current and an output voltage generated by the electron-hole pairs. In FIG. 17A, reference numerals 135 and 138 represent an electron current and a hole current caused by movement of electrons and holes, respectively. Since mobility of holes is normally smaller than that of electrons, a graph as shown in FIG. 17A is obtained. In a high efficiency semiconductor radiation detector such as a CdTe (cadmium telluride), it is known that mobility $\mu_h$ of holes is about 1/10 of mobility $\mu_e$ of electrons.

Figure 16:
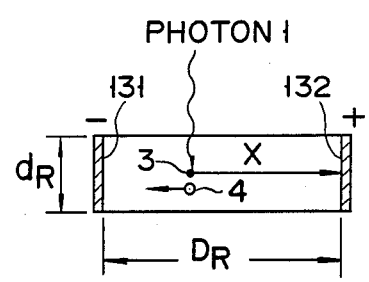
FIGS. 16 to 18 are illustrations to explain basic operations of the matrix gamma camera shown in FIG. 15.

Assuming that an incident position of photons 1 is located at distance X from a surface of high voltage electrode 132 as shown in FIG. 16, an induction current is given by the following equation (23):

$$I(t) = (Q_e V/D_R^2) \mu_e e^{-t/T_e} + \tag{23}$$
$$(Q_h V/D_R^2) \mu_h e^{-t/T_h}$$
$$(0 \leq t \leq D_R Y X/\mu_e V).$$

$$I(t) = (Q_h V/D_R^2) \mu_h e^{-t/T_h} \tag{24}$$
$$(D_R X/\mu_e V \leq t \leq D_R(D_R - X)/\mu_h V)$$

note that when $D_R(D_R-X)/\mu_h V \leq D_R X/\mu_e V$, the equation (23) is applied.

$$I(t) = 0, \; (t \geq D_R(D_R-X)/\mu_h V) \tag{25}$$

note that when $D_R(D_R-X)/\mu_h V \leq D_R X/\mu_e V$, it is required that $t \geq D_R X/\mu_e V$.

In the equations (23), (24), and (25), $Q_e$ and $Q_h$ respectively represent the number of charges of electron-hole pairs, V is an electrode voltage, and $\tau_e$ and $\tau_h$ respectively represent lifetimes of electrons and holes. These various conditions must be taken into consideration because the electron-hole pairs disappear by trapping and the like during movement thereof.

Figure 18A:
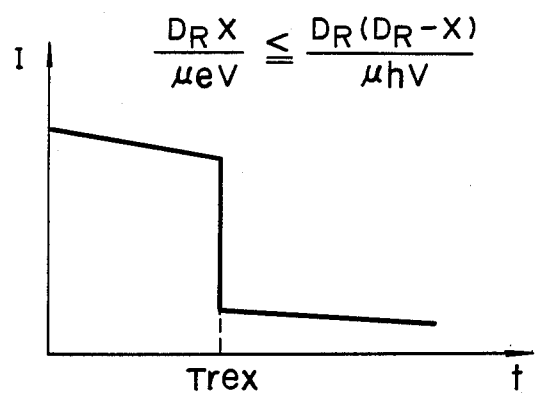
Figure 18B:
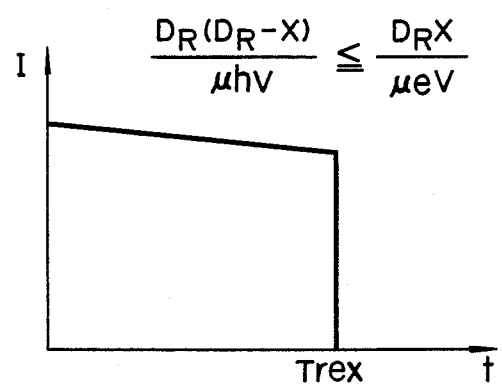

Therefore, in accordance with an incident position of radiation, a deterioration over time of the induction current is obtained as shown in FIG. 18A when $D_R X/\mu_e V \leq D_R(D_R-X)/\mu_h V$, and is obtained as shown in FIG. 18B when $D_R(D_R-X)/\mu_h V \leq D_R X/\mu_e V$. In either case, a change in the current value when electrons 3 reach the electrode is clear. Therefore, by measuring the reach time (i.e., induction current duration time $T_{reX}$) of electrons, incident position X of radiation can be calculated.

Note that the resolution of position detection is determined by measurement accuracy of induction current duration time $T_{reX}$. Since the current value itself decreases as interelectrode distance $D_R$ is increased, current $I_e(t) = (Q_e V/D_R^2)\mu_e \cdot e^{-t/\tau_e}$ caused by movement of electrons must be much larger than current $I_h(t) =$ $\sqrt{2qI_{DC}\Delta f}$ caused by shot noise of a leakage current (where q: an electric charge of electrons, $I_{DC}$: a leakage current DC value, and $\Delta f$: frequency band).

Therefore, in order to increase the above-defined distance $D_R$, a high-resistance semiconductor radiation detector with a small leakage current is preferably used, and lifetime $\tau_e$ of electrons must be long. Note that in this embodiment, a size of a semiconductor radiation detector is such that $d_R$=about 2 mm and $D_R$=about 6 mm.

Figure 19:
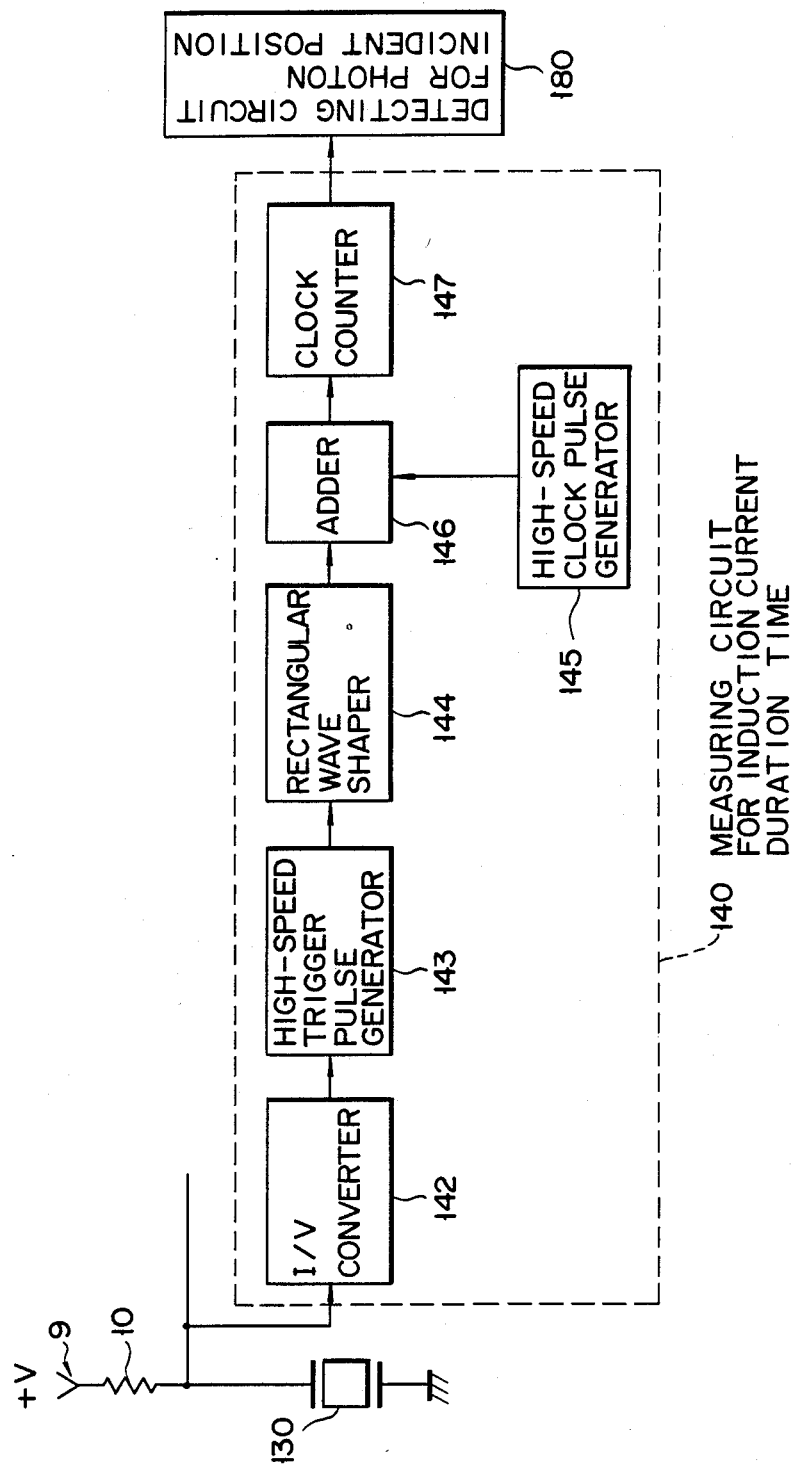
FIG. 19 is a schematic diagram of the measuring circuit for induction current duration time used in the camera shown in FIG. 15.

A circuit configuration for detecting incident position X of photon 1 will be briefly described below. In this embodiment, in addition to a charge sensitive converting preamplifier output corresponding to an energy of incident photon 1, measuring circuit 140 for induction current duration time and detecting circuit 180 for photon incident position are provided, as shown in FIG. 19. Measuring circuit 140 for induction current duration time may be constituted by I/V converter 142, high-speed trigger pulse generator 143, rectangular wave shaper 144, high-speed clock pulse generator 145, adder 146, and clock counter 147. Detecting circuit 180 for photon incident position executes the following equation (26) on the basis of induction current duration time $T_{reX}$ obtained by measuring circuit 140 for induction current duration time, thereby obtaining photon incident position X:

$$T_{reX} = X/V_{de} \quad (26)$$

where
$V_{de} = \mu_e \cdot E$, and
$\mu_e$: mobility of electrons
E: electric field strength
can be obtained beforehand. That is, the gamma camera according to this embodiment utilizes the fact that mobility of holes is smaller than that of electrons under the condition that an average moving distance of electrons of semiconductor radiation detector 130 is much larger than interelectrode distance $D_R$, and measures the induction current duration time by rectangular semiconductor radiation detector 130 elongated along the longitudinal direction thereof, i.e., a straight line intersecting the opposite electrodes, thereby detecting photon incident position X along the longitudinal direction. It is a matter of course that a photon incident position along a direction perpendicular to the electrode direction can be detected by a channel where a signal is generated.

As described above, the gamma camera of this embodiment is constituted such that semiconductor radiation detectors 130 each including a voltage detecting circuit and an X (position) detecting circuit are two-dimensionally arranged in a matrix manner, and a shape of each semiconductor radiation detector 130 is rectangular sized by $D_R=3d_R$. Therefore, the gamma camera of this embodiment only requires $\{(m/3) \times n\}$ detectors and $\{(m/3) \times n\}$ voltage output circuits added with $\{(m/3) \times n\}$ X detecting circuits while a conventional gamma camera requires $(m \times n)$ detectors and $(m \times n)$ voltage output circuits. Furthermore, if a lateral/transverse direction common output type gamma camera is constituted such that a high voltage side is X-detection output circuit 190 and a ground side is voltage output circuit 200 (or vice versa), (m/3+n) detectors, (m/3) X-detecting circuits, and (n) voltage output circuits need only be provided while (m+n) detectors and (m+n) voltage output circuits are conventionally required.

Practical Gamma Camera Including Rectangular Detectors

Figure 22B:
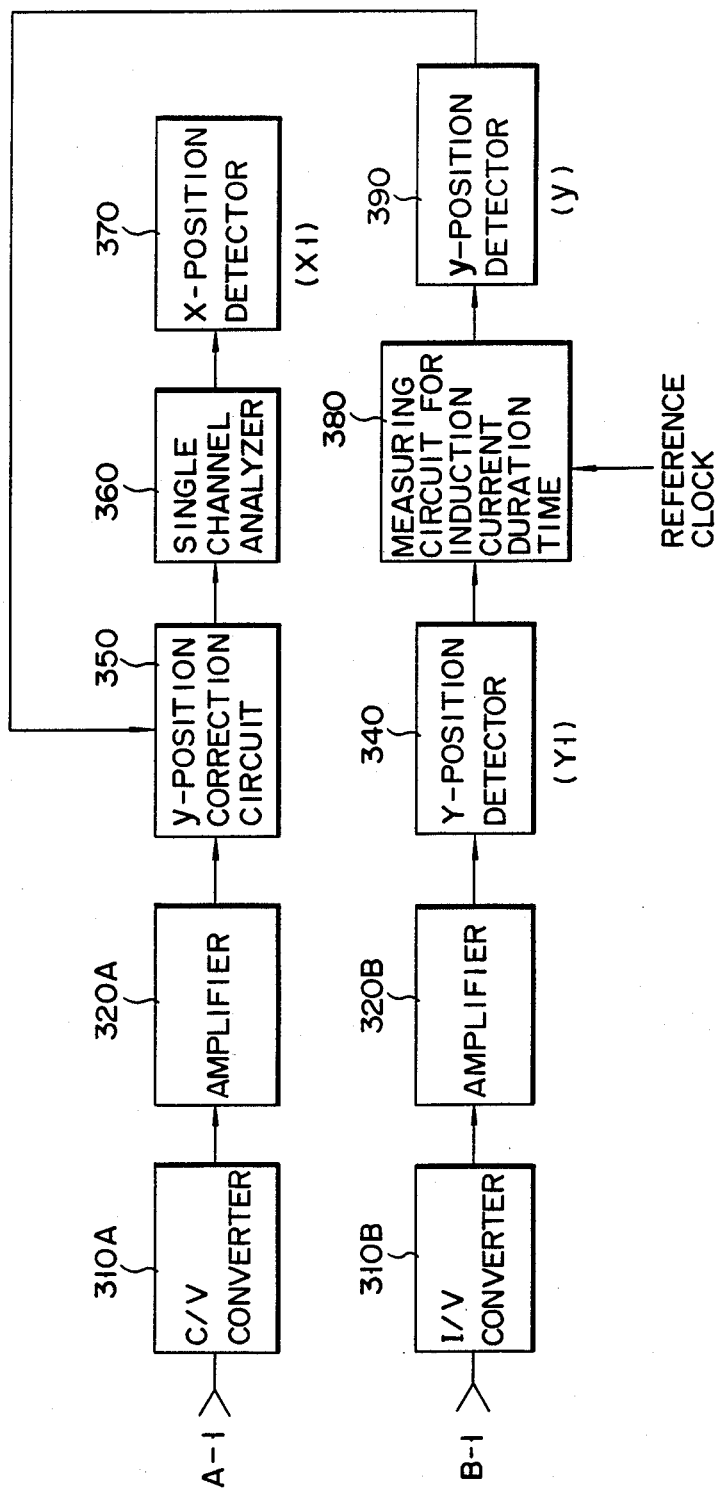

Referring now to FIGS. 22A and 22B, a description will be made of practical gamma camera 300 obtained by arranging rectangular gamma-ray rectangular detector elements 130 shown in FIGS. 15 and 16.

First, detector elements 130 are arranged in a 4×2 matrix, bias voltage V is applied to high voltage side electrodes 131 through resistors $R_{X1}$ to $R_{X4}$, and low voltage side electrodes 132 are grounded through resistors $R_{Y1}$ and $R_{Y2}$. In the drawing (FIG. 22A), a transverse direction is defined as an X-direction, a lateral direction is defined as a Y-direction, and a distance from a photon incident position of each detector element 130 along this Y-direction to the high voltage side electrode is defined as y.

FIG. 22B is a schematic block diagram of a signal processing circuit system for gamma camera 300, connected to, e.g., signal output terminals A-1 and B-1 from one pair of electrodes 131 and 132 of detector elements 130 shown in FIG. 22A. For the sake of simplicity, only the signal processing circuit system of detector elements 130 of one channel is shown.

The signal processing circuit system of signal output terminal A-1 of high voltage side electrodes 131 is constituted by a series-connected circuit formed by charge sensitive converting preamplifier 310A, amplifier 320A, y-position correction circuit 350, single channel analyzer 360, and X-position detector 370. On the other hand, the signal processing circuit system of signal output terminal B-1 of low voltage side electrodes 132 is constituted by a series-connected circuit formed by I/V converter 310B, amplifier 320B, Y-position detector 340, measuring circuit 380 for induction current duration time, and y-position detector 390.

An output from y-position detector 390 is supplied to y-position correction circuit 350 of the other signal processing circuit system.

In the signal processing system as described above, a magnitude of an induction current generated at high voltage side electrodes 131 changes in correspondence to a y-position of the Y-direction of a photon incident position (on detector elements 130).

That is, as described above, changes in the magnitude of the induction current depend on the y-position on relevant detector elements 130.

Generally, such photon incident position dependency must be corrected, and particularly in rectangular element 130, correction need is extremely strong.

A method of y-position correction is as follows: First, it is determined by y-position detector 370 and Y-position detector 340, which detector element 130 receives photons with respect to a matrix array position. For example, since it is assumed in this example that photons are incident on upper left detector element 130 connected to input terminals A-1 and B-1, incident distance y of element 130 along the Y-direction from high voltage electrode 131 is detected by y-position detector 390. That is, y is obtained by the following equation (27):

$$y = V_{de} \cdot T_{ry} \quad (27)$$

where $V_{de}$ is a drift velocity of electrons 3 and $T_{ry}$ is a duration time measured by measuring circuit 380 for induction current duration time.

On the basis of y thus obtained, the following equation (28) is calculated in y-position correction circuit 350:

$$E_{truth} = V_{max}/y \tag{28}$$

where $V_{max}$ is a maximum voltage corresponding to maximum energy of the incident photons obtained by C/V converter 310A. Maximum voltage $V_{max}$ is corrected by the equation (28) because it changes in accordance with incident position y.

As a result, the photon incident energy of the incident photons depending on the y-position of detector element 130 can be correctly recognized.

Modification

The present invention is not limited to the embodiments described above, but can be variously modified within the spirit and scope of the invention.

Figure 8:
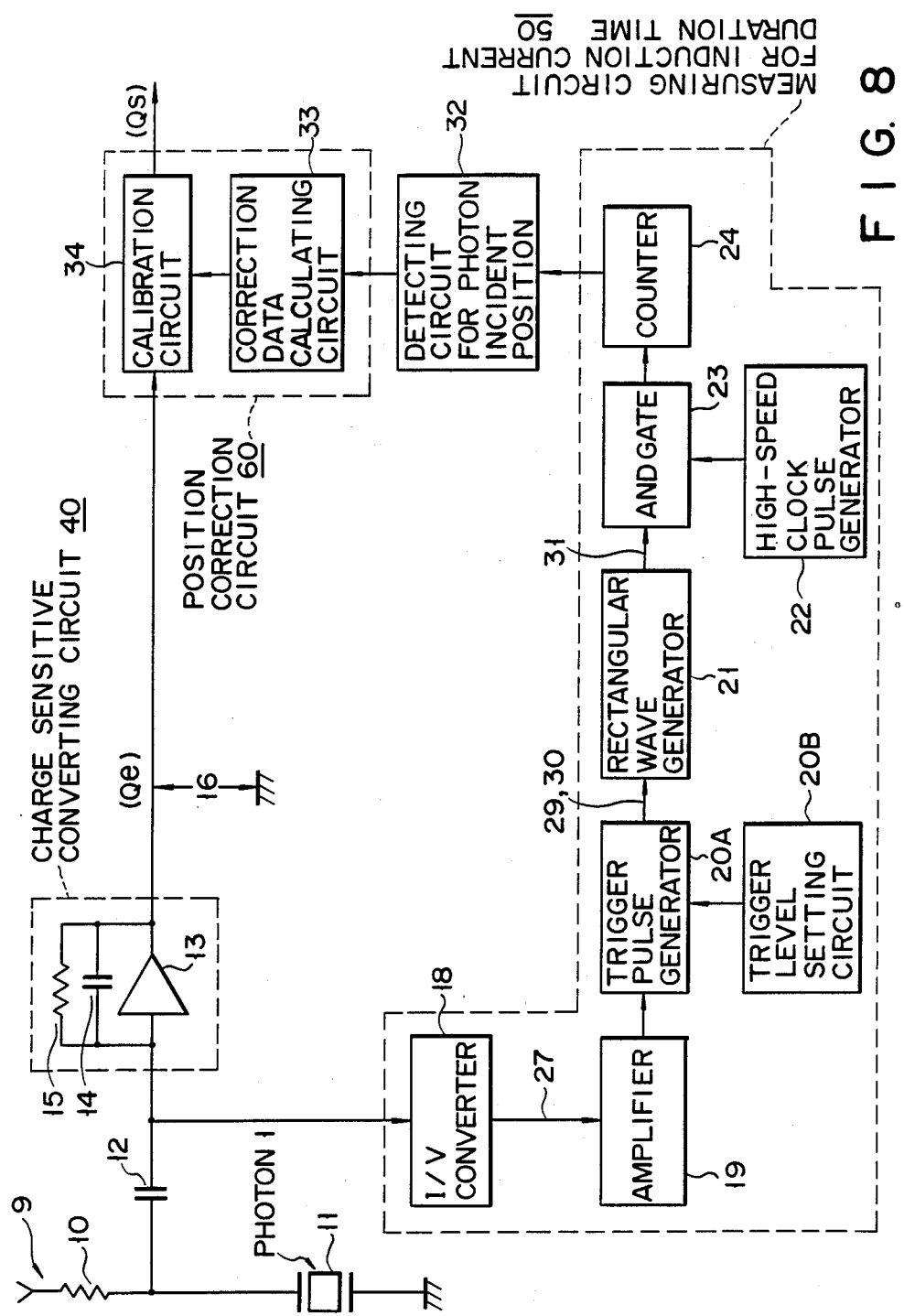
FIG. 8 is a schematic diagram of a radiation detector according to one preferred embodiment of the invention.

For example, in the embodiment shown in FIG. 8, charge sensitive converting circuit 40 and measuring circuit 50 for induction current duration time were connected to the high voltage electrode side of semiconductor γ-ray detector 11. However, measuring circuit for induction current duration time 50 may be connected to the ground side of semiconductor γ-ray detector 11 as shown in FIG. 21. In addition, a connection method opposite to that shown in FIG. 21 may be adopted, and both the circuits may be connected to the ground side.

What is claimed is:

1. A radiation detecting circuit arrangement comprising:
    a semiconductor radiation detector having two electrodes to sandwich the detector, to which a predetermined biasing voltage is being applied, for detecting radiation energy incident thereon to derive an electric signal;
    a converting circuit for converting total electric charge induced in the detector into a corresponding voltage in response to the electric signal detected from the detector;
    a circuit for measuring a duration time period of induction current caused by movement of electrons occurring in the detector in response to the detected electric signal;
    a circuit for detecting a position of the radiation incident upon the detector on the basis of said duration time period of induction current to produce a positional signal of the incident radiation; and
    a circuit for correcting the voltage output from the converting circuit based upon the positional signal of the incident radiation to thereby produce an energy value of the radiation independent of the incident position thereof.

2. An arrangement as claimed in claim 1, wherein said position detecting circuit produces the positional signal of the incident radiation by multiplying the duration time period of the induction current by a predetermined parameter.

3. An arrangement as claimed in claim 2, wherein said parameter includes mobility of the electrons occurring in the detector, and an electric field strength of the detector caused by the applied biasing voltage.

4. An arrangement as claimed in claim 1, wherein said duration time period measuring circuit includes:
    a current/voltage converter for converting the electric signal from the detector into a corresponding voltage, said corresponding voltage containing a voltage caused by movement of the electrons, and a voltage caused by movement of the holes;
    a discriminator for discriminating said voltage caused by movement of the electrons from said voltage caused by movement of the holes based upon their levels; and
    a measuring circuit for measuring the duration time period of the induction current based upon only said voltage caused by movement of the electrons derived from the discriminator.

5. An arrangement as claimed in claim 1, wherein said correction circuit includes:
    a circuit for calculating correction data by processing the positional signal of the position detecting circuit on the basis of various conditions of the electrons and holes occurring in the detector; and
    a calibration circuit for calibrating the voltage derived from the converting circuit based upon the correction data from the correction data calculating circuit, to thereby produce the energy value of the radiation independent of the incident position thereof.

6. An arrangement as claimed in claim 1, further comprising:
    a first A/D (analog-to-digital) converter interposed between said charge converting circuit and said correcting circuit, for analog-to-digital converting the voltage derived from said charge converting circuit into corresponding digital voltage data; and
    a second A/D converter interposed between said position detecting circuit and said correcting circuit, for analog-to-digital converting the positional signal derived from said positional detecting circuit into corresponding digital position data, whereby said correcting circuit corrects the digital voltage data based upon the digital position data.

7. An arrangement as claimed in claim 6, wherein said semiconductor radiation detector is constructed of a matrix array including "M" numbers of semiconductor radiation detecting elements aligned along a first direction, and "N" numbers of semiconductor radiation detecting elements aligned along a second direction perpendicular to the first direction, said M and N being integers.

8. An arrangement as claimed in claim 7, wherein said "M" numbers of the semiconductor radiation detecting elements are equal to "N" numbers thereof.

9. An arrangement as claimed in claim 1, wherein said semiconductor radiation detector is constructed of a matrix array including "M" numbers of semiconductor radiation detecting elements aligned along a first direction, and "N" numbers of semiconductor radiation detecting elements aligned along a second direction perpendicular to the first direction, said M and N being integers.

10. An arrangement as claimed in claim 7, wherein said "M" numbers of the semiconductor radiation detecting elements are equal to "N" numbers thereof.

11. An apparatus as claimed in claim 1, wherein said semiconductor radiation detector is shaped as a rectangular detector elongating along a straight line intersecting center positions of said two electrodes.

12. A radiation detecting circuit arrangement comprising:
    a rectangular semiconductor radiation detector having two electrodes to sandwich the detector along a longitudinal direction of the detector, to which a predetermined biasing voltage is being applied, for detecting radiation energy incident thereon to derive an electric signal;

a converting circuit for converting total electric charge induced in the detector into a corresponding voltage in response to the electric signal detected from the detector;

a circuit for measuring a duration time period of induction current caused by movement of electrons occurring in the detector in response to the detected electric signal;

a circuit for detecting a position of the radiation incident upon the detector on the basis of said duration time period of incident current to produce a positional signal of the incident radiation; and, a circuit for correcting the voltage output from the converting circuit based upon the positional signal of the incident radiation to thereby produce an energy value of the radiation independent of the incident position thereof.

13. An arrangement as claimed in claim 12, wherein said position detecting circuit produces the positional signal of the incident radiation by multiplying the duration time period of the induction current by a predetermined parameter.

14. An arrangement as claimed in claim 13, wherein said parameter includes mobility of the electrons occurring in the detector, and an electric field strength of the detector caused by the applied biasing voltage.

15. An arrangement as claimed in claim 12, wherein said rectangular semiconductor radiation detector has first and second terminals, said first and second terminals are connected to the respective opposite electrodes, said first electrode is connected to said biasing voltage and to said charge converting circuit, and said second electrode is connected to a ground potential and to said duration time measuring circuit.

16. An arrangement as claimed in claim 12, wherein said rectangular semiconductor radiation detector is manufactured from cadmium telluride (CdTe).

* * * * *